United States Patent
Aubin

(10) Patent No.: US 12,210,362 B2
(45) Date of Patent: Jan. 28, 2025

(54) METHOD FOR CONFIRMING AN EXECUTION OF A CONSUMPTION REDUCTION COMMAND

(71) Applicant: Wabtec Hauts-de-France, Saint-Pierre-des-Corps (FR)

(72) Inventor: Philippe Aubin, Chanceaux sur Choisille (FR)

(73) Assignee: Wabtec Hauts-de-France, Saint-Pierre-des-Corps (FR)

( * ) Notice: Subject to any disclaimer, the term of this patent is extended or adjusted under 35 U.S.C. 154(b) by 451 days.

(21) Appl. No.: 17/771,385

(22) PCT Filed: Oct. 21, 2020

(86) PCT No.: PCT/FR2020/051897
§ 371 (c)(1),
(2) Date: Apr. 22, 2022

(87) PCT Pub. No.: WO2021/079061
PCT Pub. Date: Apr. 29, 2021

(65) Prior Publication Data
US 2022/0363105 A1 Nov. 17, 2022

(30) Foreign Application Priority Data
Oct. 24, 2019 (FR) ...................................... 1911940

(51) Int. Cl.
*G05D 23/19* (2006.01)
*B60H 1/00* (2006.01)
(Continued)

(52) U.S. Cl.
CPC ..... *G05D 23/1905* (2013.01); *B60H 1/00278* (2013.01); *B61L 27/16* (2022.01);
(Continued)

(58) Field of Classification Search
None
See application file for complete search history.

(56) References Cited

U.S. PATENT DOCUMENTS 5,346,163 A * 9/1994 Momma .................. B60M 3/00
                                                  104/301
9,254,753 B2 * 2/2016 Sawa ........................ B60L 9/22
(Continued)

FOREIGN PATENT DOCUMENTS

CN       115003550 A  *  9/2022  ......... B60H 1/00278
CN       115243922 A  *  10/2022 ............. B60L 1/003
(Continued)

OTHER PUBLICATIONS

International Search report for corresponding International application No. PCT/FR2020/051897.
(Continued)

*Primary Examiner* — Kevin R Steckbauer
(74) *Attorney, Agent, or Firm* — K&L Gates LLP

(57) ABSTRACT

The invention relates to a method for confirming an execution of a command for reducing electrical power consumption of at least one passenger transport vehicle. The method may include sending a consumption reduction command signal to the regulation system of each vehicle. The command signal may be modulated by a reference signal. The method also may include obtaining a signal of the power consumed by the air conditioning system(s) of the set of vehicles in response to the reference signal, and confirming execution of the consumption reduction command according to characteristics of the signal of power consumed by the air conditioning system(s) of the set of vehicles.

20 Claims, 4 Drawing Sheets

(51) Int. Cl.
*B61L 27/16* (2022.01)
*F24F 140/60* (2018.01)
*H02J 3/14* (2006.01)
*H02J 13/00* (2006.01)

(52) U.S. Cl.
CPC .......... *H02J 3/14* (2013.01); *H02J 13/00004* (2020.01); *B60H 1/00735* (2013.01); *F24F 2140/60* (2018.01); *H02J 2310/40* (2020.01); *H02J 2310/60* (2020.01)

(56) References Cited

U.S. PATENT DOCUMENTS

| | | | | |
|---|---|---|---|---|
| 10,730,363 | B2 * | 8/2020 | Huaulme | B60H 1/3208 |
| 2012/0246495 | A1 * | 9/2012 | Bailey | H02J 13/00002 |
| | | | | 713/300 |
| 2015/0191090 | A1 * | 7/2015 | Sawa | B60L 7/18 |
| | | | | 701/19 |
| 2016/0075350 | A1 * | 3/2016 | Becker | B60L 15/40 |
| | | | | 701/19 |
| 2016/0264077 | A1 * | 9/2016 | Abousleiman | B60L 1/003 |
| 2017/0334264 | A1 * | 11/2017 | Huaulme | B60H 1/00428 |
| 2022/0363105 | A1 * | 11/2022 | Aubin | B61L 27/16 |
| 2023/0078281 | A1 * | 3/2023 | Aubin | B60L 1/003 |
| | | | | 307/9.1 |

FOREIGN PATENT DOCUMENTS

| | | | | |
|---|---|---|---|---|
| CN | 118285034 A * | 7/2024 | | H02J 3/144 |
| EP | 3037317 A1 | 6/2016 | | |
| EP | 4048547 B1 * | 4/2024 | | B60H 1/00278 |
| FR | 2839285 A1 | 11/2003 | | |
| FR | 3011912 A1 | 4/2015 | | |
| FR | 3102406 A1 * | 4/2021 | | B60H 1/00278 |
| FR | 3107861 A1 * | 9/2021 | | B60L 1/003 |
| WO | WO-2015055922 A1 * | 4/2015 | | B60H 1/00778 |
| WO | WO-2020141278 A1 * | 7/2020 | | B60H 1/00371 |
| WO | WO-2021079061 A1 * | 4/2021 | | B60H 1/00278 |
| WO | WO-2021175847 A1 * | 9/2021 | | B60L 1/003 |

OTHER PUBLICATIONS

Written Opinion of the International Searching Authority for corresponding International application No. PCT/FR2020/051897.

* cited by examiner

METHOD FOR CONFIRMING AN EXECUTION OF A CONSUMPTION REDUCTION COMMAND

CROSS-REFERENCE TO RELATED APPLICATIONS

This application is a national stage entry of and claims priority to International Patent Application No. PCT/FR2020/051897 (filed 21 Oct. 2020), the entire disclosure of which is incorporated herein by reference.

BACKGROUND

Technical Field

The present invention concerns a method for confirming an execution of a command for reducing consumption of a set of passenger transport vehicles, such as rail vehicles.

The invention applies to fleets of vehicles for rail transport for example such as trains, subways, tramways, trolleybuses, etc., supplied by an electricity network.

State of the Art

Ideally, the electrical energy produced by the energy production centers must be equal to the electrical energy consumed by all the electricity consumers. To attain this objective, energy consumption predictions are made, for example daily, for the major electricity consumers such as the transport sector, steel manufacture, etc. According to the predictions, the production of electrical energy by the energy production centers as well as the management of deviations in consumption from the predicted consumption, are planned by the company managing the electricity network.

When the company managing the electricity network, which has the task of maintaining the balance between electricity supply and electricity demand, identifies one or more peak periods in which the consumption is greater than the electricity production, or identifies a situation in which the electricity consumption is slightly greater than the electricity production and would lead to the unnecessary start-up of an additional production unit, the company establishes a load management strategy. This strategy consists in temporarily reducing the electricity consumption, with a time step of 30 minutes for example, to reestablish the balance between the electricity production and consumption. Thus, in response to a load management command transcribing the directives issued by the management company, the industrial operators, who are big consumers of electricity, are invited to reduce their electricity consumption, by for example stopping some of their electrical equipment.

Currently, passenger transport, and in particular rail transport, is one of the biggest electricity consumers.

In a passenger transport vehicle, such as a rail vehicle, the air conditioning system is the equipment that is the highest electrical energy consumer after the vehicle propulsion system. As the electrical energy consumed by the air conditioning is variable depending on the seasons and weather variations at times, it is sometimes difficult to predict the electrical energy consumption for an entire fleet of vehicles. When the fleet of vehicles consumes a quantity of energy greater than the predictions, the company operating the fleet is thus penalized by the company managing the electricity network, when the overconsumption is made during critical periods, such as periods having consumption peaks.

Systems exist, such as described in document FR3011912, enabling the consumption of the air conditioning systems of a fleet of rail vehicles to be reduced remotely and in real-time. Nevertheless, one of the requirements imposed on the industrial operators, in order to be able to be integrated into a load management strategy, is to be able to provide evidence of the execution of a load management command transcribing the directives issued by the management company.

BRIEF DESCRIPTION

The invention is directed to providing a technical solution making it possible to confirm the execution of a command for consumption reduction in response to load management directives issued by a management company.

In this connection, the present invention concerns, according to a first aspect, a method for confirming an execution of a command for reducing consumption of the electrical power of at least one passenger transport vehicle. Each vehicle includes a temperature regulation system and a temperature sensor. The regulation system may be associated with air conditioning means and may maintain the temperature of a cabin of the vehicle at a setpoint temperature according to a temperature measured in the cabin by the temperature sensor. The method may include sending a command signal to the regulation system of each vehicle. The command signal may be modulated with a reference signal. The method also may include obtaining a signal of the power consumed by the air conditioning means of the set of vehicles in response to the reference signal. The method may include confirming the execution of the consumption reduction command according to characteristics of the signal of power consumed by the air conditioning means of the set of vehicles.

Thus, the method makes it possible, by using a command signal modulated with a reference signal, to confirm the execution of the command, for the reduction of the power consumed by the air conditioning means. More particularly, when it is possible, in the signal of power consumed by the air conditioning means of the entirety of the rail vehicles, to isolate a component having a similar form to the reference signal, this constitutes the confirmation that the power consumed has indeed been made in response to the command signal modulated by the reference signal. Therefore, when the command signal comprises a signal for governing the variation in the electrical power (e.g., a load management signal), the method makes it possible to confirm the reception and the execution of the command for load management and to provide evidence to a management company.

Obtaining the signal of the power consumed by the air conditioning means in response to the reference signal may include determining a signal of a total electrical power consumed by the set of vehicles in response to the command signal, and demodulating the signal of total electrical power consumed by the set of vehicles.

Demodulating the signal of power consumed by the set of vehicles of power in response to the reference signal makes it possible to identify the components of the power having the same predetermined signature as a reference signal (included in the command signal sent). The demodulating may for example consist in multiplying the total of the power consumption of the fleet of vehicles obtained previously, by the reference signal.

The sending step may comprise a step in which a value of the command signal at a time t is added to the temperature measured at a same time t by the temperature sensor.

It will be noted that, in known manner, an air conditioning system comprises regulating means configured to maintain the temperature of a cabin at a setpoint temperature, whether it be to heat or cool the cabin. In general, temperature sensors measure the temperature of the cabin. This measured temperature is then compared to the setpoint temperature to activate or not activate actuators of the air conditioning system, depending on the result of the comparison, enabling the cabin to be heated or cooled for it to attain the setpoint temperature. Here, the temperature sensor is biased, such that, at a time t, the temperature measured by the temperature sensor is incremented or decremented by a temperature value of the command signal at the time t. Of course, the signal value may be positive or negative, making it possible to increment or decrement the temperature. This thus makes it possible to reduce the electricity consumption by the air conditioning means, for example, by incrementing the temperature measured by the temperature sensor when the air conditioning means are configured to heat, or by decrementing the temperature measured by the temperature sensor when the air conditioning means are configured to cool. The values of the command signal are hence chosen accordingly. The reference signal, serving for the modulation of the command signal, is chosen such that its impact on this system for biasing the temperature sensor is limited when it is not used in combination with a load management signal. Therefore, the amplitude of the signal is chosen such that the impact of the signal is without incidence on the comfort of the passengers.

The modulated command signal may be the sum of a signal for governing the variation in the electrical power consumed and the reference signal.

The signal for governing the variation in the power, which may also be called load management signal, is a signal transcribing the load management directives sent by the management company. Before being sent to the air conditioning means, the signal for governing the variation in the power is modulated by a reference signal, by summing, to obtain a command signal that can be sent to the air conditioning means. This modulation makes it possible, thanks to the reference signal signature, to be capable of identifying, within the total power consumed, a component having the same signature.

The obtaining step may include obtaining an intermediate signal by multiplying the signal of total electrical power consumed by the set of vehicles, by the reference signal, and filtering the intermediate signal.

Further to demodulating the total power consumed by multiplying by the reference signal, there is obtained the sum of a continuous signal, of which the amplitude is equal to the power consumed by the air conditioning means in response to the reference signal, and of a signal of high frequency components. To limit the signal obtained to the signal of the power consumed in response to the reference signal, a filtering operation is carried out to remove the signal of high frequency components. The filtering may for example be carried out by a low-pass filter.

The reception of the command signal may be confirmed if the filtered intermediate signal has an amplitude greater than a predetermined threshold. The predetermined threshold is chosen greater than 0, to avoid false confirmation with the detection of the system noise. Furthermore, the predetermined threshold is chosen to be consistent with the expected power consumed by the air conditioning means taking into consideration the number of vehicles in the fleet receiving the command, as well as the amplitude of the command signal.

As output from the low pass filter, only the signal of the power consumed in response to the reference signal is obtained. The amplitude of this signal is thus the power consumed by the air conditioning means in response to the reference signal. If the signal obtained as output from the low pass filter is zero or has an amplitude less than a predetermined threshold (symbolizing the limit starting from which the signal is considered or not considered as noise), this means that there are no components in the signal of total power consumed which correspond to the power of the reference signal. In other words, this means that the command for reducing consumption has not been received and/or executed by the air conditioning means.

The determining step may include determining the signals of electrical powers consumed for sub-sets of vehicles in response to the command signal, and deducing the signal of total electrical power consumed by the set of vehicles, by the sum of the electrical power signals of the sub-sets (e.g., dividing the signal of the total electrical power by the sum, or determining or calculating the signal of the total electrical power using the sum of the electrical power signals).

As a matter of fact, in the case in which the rail transport vehicles of the fleet are organized by sub-sets, the power consumed for the sub-sets is calculated. This may, in an alternative embodiment, make it possible to obtain the confirmation of the execution of a command for consumption reduction for each of the sub-sets.

The reference signal may be a sinusoidal signal or some signal with a temporal signature that can be characterized. In other words, the reference signal has a form with a change over time that can be characterized. This sinusoidal signal may have a period chosen such that the signal cannot be confused with periods and alternations arising from the use of the system, for example such as the day/night alternation. Preferably, the period may be 2504 seconds. Advantageously, the period of the reference signal is chosen so that it cannot be confused with the harmonics of day/night alternation, having characteristic differences in electricity consumption. The signal is selected with an amplitude comprised between [0° C.; 1° C.], preferably between [0.2° C.; 0.5° C.], and is preferably equal to 0.2° C. The amplitude is chosen sufficiently low not to affect the comfort of the passengers (e.g., it is imperceptible by the passengers), so as not to vary the temperature of the cabins or compartments of the transport vehicles too much. Nevertheless, the amplitude must be sufficiently high for it to be visible by the system, and for it not to be possible to confuse the reference signal with the system noises.

According to a second aspect, the invention is directed to a device for managing electrical energy consumption comprising means for confirming an execution of a command for reducing electrical power consumption that are configured to implement the method as aforementioned.

Still other particularities and advantages of the invention will appear in the following description.

BRIEF DESCRIPTION OF THE DRAWINGS

The invention, according to an example embodiment, will be well understood and its advantages will be clearer on reading the following detailed description, given by way of illustrative example that is in no way limiting, with reference to the accompanying drawings in which.

Identical parts represented in the figures are identified by identical numerical references.

DETAILED DESCRIPTION

The invention finds an application in the field of passenger transport vehicles supplied by an electricity network, in rail transport vehicles, whether they be dedicated to traveling long distances or short distances, such as vehicles for urban rail transport, for example such as subways and tramways.

The invention applies to a fleet or set of passenger transport vehicles, each vehicle comprising at least one air conditioning system.

In general, a rail type passenger transport vehicle is equipped with several air conditioning systems. Below, by air conditioning system is meant a system able to cool or heat the cabin or cabins of a rail vehicle. The air conditions of each cabin of the passenger transport vehicle are regulated by an air conditioning system. For example, in a rail vehicle, each wagon has an air conditioning system regulating its own air conditions. In other examples, a same air conditioning system can regulate the air conditions of several vehicles.

In the interest of simplicity, it is considered in this document that each passenger transport vehicle of a fleet of vehicles comprises a single air conditioning system. Nevertheless, as indicated above, a vehicle may comprise several air conditioning systems. For example, a vehicle could comprise as many air conditioning systems as cabins.

Therefore, in what follows, an air conditioning system of a vehicle refers to an air conditioning system associated with at least one vehicle cabin. Furthermore, the temperature of a vehicle refers to the temperature of at least one cabin of the vehicle.

Figure 1:
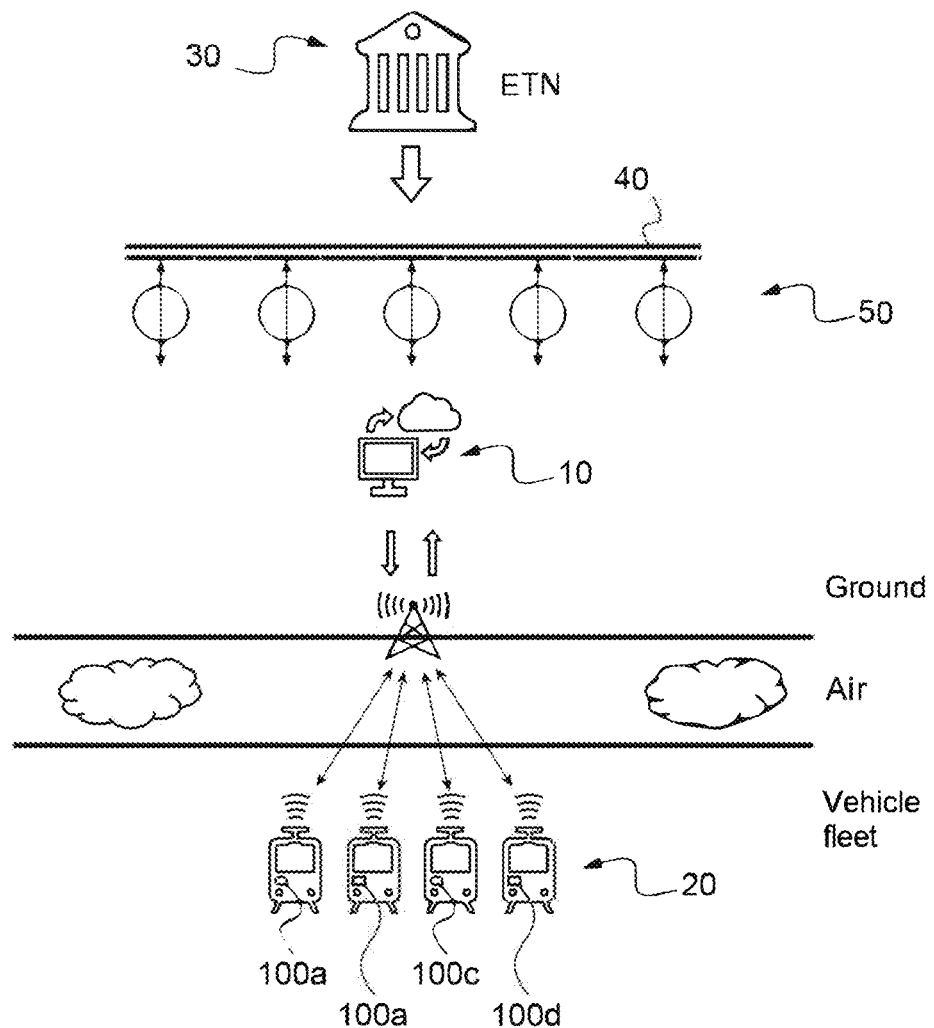
FIG. 1 is a diagram diagrammatically illustrating the context of use of the method for confirming an execution of a command for reducing electrical power consumption of at least one vehicle for passenger transport in accordance with an embodiment.

FIG. 1 shows the context of use of the method for confirming an execution of a command for reducing consumption of the electrical power of a fleet or set of passenger transport vehicles 20.

In the illustrated embodiment, the confirming method is implemented on a management device 10 for managing the energy consumption placed on the ground. In other embodiments, the energy consumption management device 10 may be on board one or more passenger transport vehicles of the fleet of vehicles.

The energy consumption management device 10 comprises a server or servers comprising means required for the implementation of the method for confirming an execution of a command for reducing electrical power consumption of at least one passenger transport vehicle which will be described below with reference to FIG. 2.

The energy consumption management device 10 may communicate with servers of the company 30 managing the electricity network 40 via communication means, as well as with the passenger transport vehicles of the fleet 20.

In certain situations, for example when the electrical energy consumption of the set of electricity consumers 50 is greater than the forecasts of a given moment, the company 30 managing the electricity network 40 issues an instruction (or directives) for load-shedding or load management to the electricity consumers 50.

In particular, the management company 30 instructs each electricity consumer 50 to reduce the energy consumption to have a predefined value.

The energy consumption management device 10 receiving that request from the management company 30, is configured to implement a method for reducing consumption of the electrical power to implement, if possible, the load management directives requested.

In the case of a fleet of passenger transport vehicles, the management company 30 of the electricity network 40 instructs the company exploiting the fleet of vehicles 20 to reduce the consumption of the fleet to a predefined consumption value.

In one embodiment, local control devices are placed on board the passenger transport vehicles. These local control devices are respectively associated with air conditioning systems (not shown). Each local control device is configured to measure the electricity consumption of the associated air conditioning system, and to send it to the management device 10.

In one embodiment, it is possible for the consumption reduction to concern only one vehicle, a subset of vehicles or the set of vehicles, according to the load management strategy established by the company operating the fleet. Thus, the company operating the vehicles 20, can choose which vehicles are integrated into a load management strategy in response to load management directives issued by the management company 30.

These local control devices comprise conventional means for measuring the electrical energy consumption and do not need to be described here.

For example, the electrical energy consumption is measured by monitoring the activation cycles of the actuators (or contactors) of the air conditioning system. More particularly, as the power consumed by the actuators, such as the heating resistors, the fans or the compressors is known, the electrical energy consumption is known by monitoring the activation cycles of the actuators. By way of example, a heating resistor of nominal power 10 kW with an activation cycle of 30% consumes 3 kW as a smoothed average.

In this embodiment, the management device 10 and the local control devices form an electrical energy consumption management system for a set of passenger transport vehicles 20. Such an electricity consumption management system may receive a command signal from the server/servers and increase or reduce the power consumed by the air conditioning means in response to that command.

Figure 2:
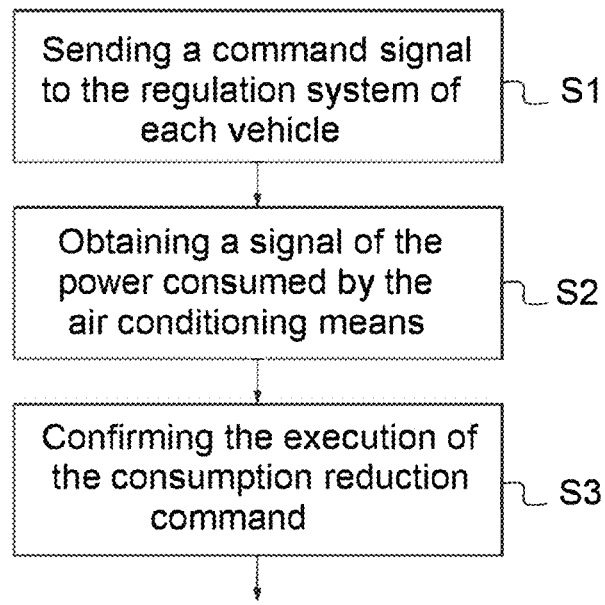
FIG. 2 illustrates steps of a method for confirming an execution of a command for reducing electrical power consumption according to an embodiment.

FIG. 2 illustrates the method for confirming an execution of a command for reducing electrical power consumption of at least one passenger transport vehicle.

The method is implemented by the management device 10. An embodiment of the management device 10 will be described with reference to FIG. 4.

When the management device 10 receives a load management instruction or request from the management company 30 managing the electricity network 40, a command signal considering these load management directives is issued to the vehicles of the rail fleet.

As explained earlier, the load management is directed to reducing the power consumed by the air conditioning system on board each of the rail vehicles of the fleet. Each air conditioning system comprises air conditioning means, a temperature regulation system and a temperature sensor. A regulation system is associated with each of the air conditioning means and is configured to maintain the temperature of a cabin of one of the vehicles at a setpoint temperature according to a temperature measured in the cabin by a temperature sensor.

To reduce the power consumed by the air conditioning means, the management device 10 of the system for managing the electricity consumption of the fleet of vehicles may issue a command for reducing consumption of the electrical power, to at least one of the passenger transport vehicles.

The principle of reducing the consumption of the air conditioning means is to bias the sensors on board in the cabins, to modify the temperature measured so as to reduce the temperature present in the passenger rooms in winter or increase it ins summer. Thus, the power consumed required to attain the setpoint temperature gets reduced, therefore making it possible reduce the consumption of the air conditioning means.

Reducing the consumption of the air conditioning means is based on the sending of a signal to bias the sensor on board the vehicle whose consumption is reduced. This signal is thus a variation of temperature according to time. At each time t, the value of the signal is added to the temperature measured in each of the cabins, to obtain a reduction in the electrical power consumption in accordance with the load management directives.

The bias signal is here called the command signal for reducing consumption and is obtained from the signal governing the variation in the electrical power consumed, resulting from the load management directives, and from what is referred to as a reference signal.

The sending step S1 of the method as illustrated in FIG. 2 is directed to sending a command signal for reducing consumption to the regulation system of each vehicle, the command signal being modulated by a reference signal.

Figure 3:
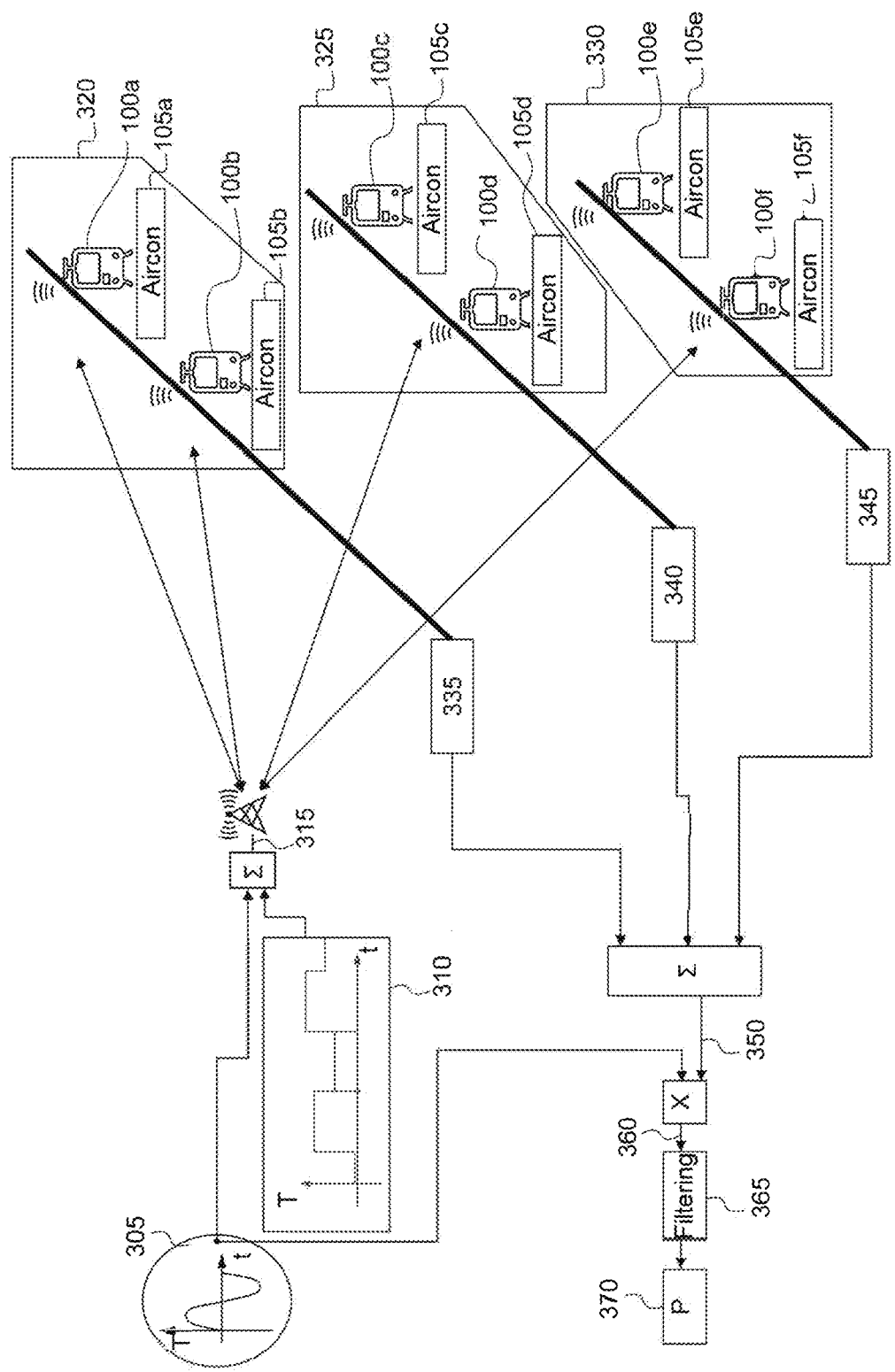
FIG. 3 illustrates the loop of the steps, from sending the command signal, until confirmation of the execution the command signal for reducing electrical power consumption.

Obtaining the command signal 315 for reducing consumption is illustrated in FIG. 3. The modulated command signal is obtained by modulating a signal 310 for governing the variation in the electrical power consumed by a reference signal 305.

In a first phase, the load management directives are transcribed into a signal that can be sent and uses subsequently in the electricity consumption management system of the fleet of vehicles. Thus, based on the load management request issued by the management company 30 there is obtained the signal 310 for governing the variation in electrical power consumed: this is a temperature variation according to time, of which the value at each time that, is used to bias the sensors of the vehicles integrated in the load management strategy. Thus, in each of the vehicles integrated into the load management strategy, the value of the command signal at a time t is added to the temperature measured at the same time t by the temperature sensor.

As can be seen, the temperature of the signal 310 for governing the variation in the electrical power consumed can vary over short periods, of the order of 30 minutes. Although not illustrated in the present example, the temperature may be negative, when the air conditioning means 105a, 105b, 105c, 105d, 105e and 105f (e.g., air conditioning systems) are configured to cool.

This signal 310 for governing the variation in the electrical power consumed is next modulated with a reference signal 305. By modulation here is meant a transformation of the signal 310 for governing the variation in the electrical power consumed from its initial non-periodic timeslot form into a form configured for its transmission, then for the identification of its signature in the total power consumed by the fleet of vehicles. Here, the transformation is the sum of the signal 310 for governing the variation in the electrical power consumed with the reference signal 305.

The reference signal 305 is a signal used to introduce, into the command signal, a signature, that is to say a specific mark or form, able to be found again in the signal of power consumed by the set of vehicles.

The reference signal 305 is here by way of example a sinusoidal signal, whose characteristics, period and amplitude, are selected as follows:

Amplitude: this must be sufficiently small. This is because, as the reference signal 305 is added to the signal for governing the variation in the electrical power consumed, it is necessary for the amplitude of the reference signal, which is a temperature, to be the smallest possible such that the amplitude has no effect on the comfort of the passengers. It must also be sufficiently high for the reference signal to be compatible with the resolution of the system, measurable and identifiable by the system for management of the electricity consumption of the fleet of vehicles. The reference signal 305 is chosen with an amplitude comprised between [0° C.; 1° C.], preferably between [0.2° C.; 0.5° C.], and preferably is equal to 0.2° C.

Period: the period must be dimensioned to be greater than the reactivity time of the air conditioning means 105a, 105b, 105c, 105d, 105e and 105f. Furthermore, the frequency associated with this period must not exist in the system in advance. For example, as the day/night alternation is a very visible frequency in the consumed power spectrum, the selected period must therefore be different therefrom. Furthermore, the frequency must be sufficiently high for the integration time for the demodulation of the power consumed by the vehicles at the server not to be too high. A period of the order of 2500 s makes it possible to satisfy the criteria as set out above. In particular, the value of 2504 s has been selected in tests.

The consumption reduction command signal 315 is then obtained. This is sent to the vehicles integrated into the load management strategy by the wireless transmission means for example. As illustrated in FIG. 3, the consumption reduction command signal is sent to all the vehicles of the fleet.

The obtaining step S2 of FIG. 2 is directed to obtaining a signal of the power consumed by the air conditioning means 105a, 105b, 105c, 105d, 105e and 105f of the set of vehicles in response to the reference signal 305.

For this, in a first phase, the signal of the total electrical power consumed by the set of vehicles in response to the command signal is determined.

The fleet of vehicles may be organized into sub-sets 320, 325 and 330, for which are determined signals 335, 340 and 345 of electrical power consumed for the sub-sets 320, 325 and 330 of vehicles in response to the command signal 315. The signal 350 of total electrical power consumed by the set of vehicles is obtained by summing all the consumed powers 335, 340 and 345 of the sub-sets 320, 325 and 330.

Once the signal 350 of total electrical power consumed by the set of vehicles in response to the command signal 315 has been obtained, it is demodulated.

The demodulation of the signal 350 of total electrical power consumed by the set of vehicles is carried out by multiplying the signal with the reference signal 305. An intermediate signal 360 is then obtained.

The confirming step S3 of FIG. 2 of the method is directed to confirming the execution of the consumption reduction command according to the characteristics of said signal of the power consumed by the air conditioning means of the set of vehicles.

For this, the intermediate signal 360 is filtered, and the result output from the filter is compared to a threshold, to confirm whether the command signal has been received.

When the command signal received by the air conditioning means 105a, 105b, 105c, 105d, 105e and 105f of the vehicles 100a, 100b, 100c, 100d, 100e and 100f is modulated with the reference signal 305 of the following form:

$$\text{ref\_signal} = 2\sin(\alpha) \qquad [\text{Equation \#1}]$$

The electrical power consumed by the air conditioning means 105a, 105b, 105c, 105d, 105e and 105f, in response to the command signal will then be of the following form:

$$\text{power}_{aircon} = A\sin\alpha \qquad [\text{Equation \#2}]$$

Thus, the total electrical power consumed 350 by the set of vehicles 100a, 100b, 100c, 100d, 100e and 100f comprises a component equal to the expression of $\text{power}_{aircon}$.

The total electrical power consumed 350 by the set of vehicles 100a, 100b, 100c, 100d, 100e and 100f may be expressed as the sum of the power consumed by the air conditioning means, $\text{power}_{aircon}$, of the set of vehicles 100a, 100b, 100c, 100d, 100e and 100f, and of the power, $\text{power}_{others}$, consumed by the other systems of the vehicles 100a, 100b, 100c, 100d, 100e and 100f (for example traction, the on-board and other equipment, etc.).

The total electrical power consumed by the set of vehicles 100a, 100b, 100c, 100d, 100e and 100f, multiplied by the reference signal 305 is then equal to an intermediate signal 360 which is then of the following form:

$$\begin{aligned}
\text{power}_{total} \times \text{ref}_{signal} &= \qquad [\text{Equation \#3}]\\
\text{power}_{aircon} \times \text{ref}_{signal} + \text{power}_{others} \times \text{ref}_{signal} &=\\
2A\sin^2\alpha + \text{power}_{others} \times \text{ref}_{signal} &= A + A\cos 2\alpha +\\
\text{power}_{others} \times \text{ref}_{signal} \text{ with } 2\sin^2\alpha &= \frac{1-\cos(2a)}{2}
\end{aligned}$$

The intermediate signal 360 is then filtered, such that on output from the filter, the high frequency components are eliminated. This may, for example, be filtering 365 with the use of a low pass filter. If the command received by the air conditioning means is indeed modulated by the reference signal 305, the high frequency components, expressed as $\text{components}_{high\,frequencies} = A\cos 2\alpha + \text{power}_{other} \times \text{ref}_{signal}$, are removed from the signal, such that a continuous signal is obtained as output equal to A, which is the power consumed 370 by the air conditioning means 105a, 105b, 105c, 105d, 105e and 105f in response to the reference signal 305.

When the command signal received by the air conditioning means does not comprise the reference signal, by modulation, output from the low pass filter, the signal is zero or equal to the system noise. As a matter of fact, the component equal to $A\sin\alpha$ representing the power consumed by the air conditioning means in response to the command signal modulated by the reference signal is not found. Without this component, it is not possible to obtain a continuous component output from the filter.

Confirmation depends on the result of the comparison of the power 370 consumed by the air conditioning means 105a, 105b, 105c, 105d, 105e and 105f in response to the references signal 305 at a predetermined threshold.

Thus, it is possible to choose a threshold representing the noise level output from the system. It is also possible, by calculating upstream the average value of the power consumed in response to the command signal to use that value (or neighboring values) as threshold. This makes it possible to have a reliable confirmation level.

Thus, obtaining a continuous signal equal to the power 370 consumed by the air conditioning means 105a, 105b, 105c, 105d, 105e and 105f in response to the reference signal 305, greater than a predetermined threshold, makes it possible to confirm that the command signal 315, that is to say the signal governing the variation in electrical power 310 modulated by the reference signal 305, has indeed been received and executed by the air conditioning means, provided that the form of the signal of the power consumed is as expected, that is to say comprising a component of the form $\text{power}_{aircon} = A\sin\alpha$.

To be sure to have the most accurate confirmation possible, it is necessary to have a sufficiently long integration period.

In the example presented here, with a reference signal 305 with a period equal to 2504 s, in an example representing the signal of power consumed by a fleet of 1000 trains each comprising 4 wagons, an integration period of one day makes it possible to have an accuracy of 10%, while an integration period of 10 days makes it possible to have an accuracy of 1%.

For this, the reference signal 305 is sent continuously to the air conditioning means, although the signal for governing the variation in electrical power 310 is zero, that is to say that no load management directive has been issued by the management company 30.

As already referred to, the reference signal 305 has an amplitude which is not very great, equal to 0.2° C. in the example, such that, although used as bias on the sensor, this variation does not affect the comfort of the passengers.

In the example, the sub-sets 320, 325, 330 of the vehicles 100a, 100b, 100c, 100d, 100e and 100 may be constituted according to their geographical positioning and the climate conditions of those geographical positions. Indeed, according to whether the weather is mild or not, and thus according to whether the air conditioning means are activated or not, the reduction in consumption may be higher or lower. As a matter of fact, when the weather is null, the air conditioning means are used little or even not at all, thus the reduction in consumption in response to load management directives is limited. It may be said that the load management potential is low. It may be evaluated according to the power consumed, before the execution of the load management directives, using as a basis the duration of activation of the contactors (or actuators) of the air conditioning means.

According to the load management potential, subsets may thus be created, and a governing signal 310 of the variation in electrical power may be determined for each sub-group taking into consideration that load management potential.

Figure 4:
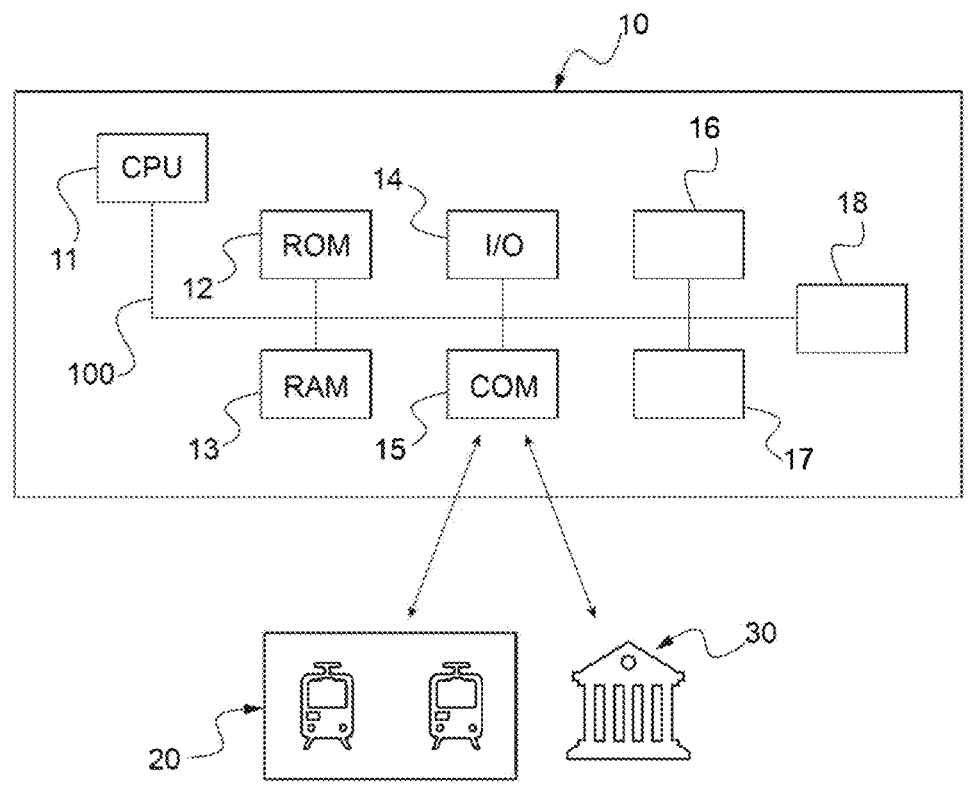
FIG. 4 illustrates a management system able to implement the method according to the invention.

FIG. 4 is a diagrammatic representation of an example of a management device 10 of the electrical energy consumption able to implement the method for confirming the proper execution of a consumption reduction command according to the invention.

The management device 10 for managing electrical energy consumption is for example one or more servers incorporating the means necessary for implementing the method for confirming the proper execution of a command for consumption reduction of a fleet of vehicles 20 in accordance with the invention.

The management device 10 comprises a communication bus 100 to which are connected:

- a processing unit 11, denoted CPU (for "Central Processing Unit") in the drawing and able to comprise one or more processors;
- a non-volatile memory 12, for example a ROM (for "Read Only Memory"), an EEPROM (for "Electrically Erasable Read Only Memory") or a Flash memory.
- a volatile memory 13 or RAM (for "Random Access Memory");
- an Input/Output interface 14, denoted I/O in the drawing, for example a screen, a keyboard, a mouse or another pointing device such as a touch screen or a remote control enabling a user to interact with the system via a graphical interface; and
- a communication interface or communication means 15, denoted COM in the drawing, configured to communicate, via a network, with servers of the company 30 managing the electricity network 40 and with the passenger transport vehicles of the fleet 20

According to one embodiment, the communication means 15 of the management device 10 comprise means for receiving data from the company 30 managing the electricity network 40 and from the passenger transport vehicles, such as a transceiver. This data may for example be consumption information representing the electrical energy consumed by the vehicles of the set, requests, or directives for load management from the company 30 managing the electricity network 40, or information on the temperature of at least one cabin of the vehicle.

Furthermore, the communication means 15 of the management device 10 comprise transmission means for sending a command for reduction of the power consumption to at least one passenger transport vehicle or to all the vehicles of the fleet (e.g., a transmitter, antenna, etc.).

The volatile memory 13 comprises registers configured for the recording of the variables and parameters created and modified during the execution of a computer program comprising instructions for the implementation of a confirming method according to the invention. The codes for instructions of the program stored in non-volatile memory 12 are loaded into RAM memory 13 for them to be executed by the processing unit CPU 110.

The non-volatile memory 12 is for example a re-writable memory of EEPROM type or Flash memory able to constitute a medium according to the meaning of the invention, to comprise a computer program comprising instructions for the implementation of the confirming method.

The electrical energy consumption management device 10 further comprises determining means (e.g., one or more processors) configured to determine a total electrical power consumed by the set of vehicles in response to a command signal (in other words an overall consumption at a given time), based on all the consumption information received, and generating means configured to generate a set of commands respectively for a subset of vehicles selected from among the vehicles of the set 20, this being in response or not being in response to load management directives.

According to one embodiment, the generating means (e.g., the same or different processors as described above) are configured to generate commands according to the group of vehicles for which the commands are provided. For example, according to the geographical position of the vehicles, if the climate conditions are either mild, for which the consumption of the air conditioning means is low, or very cold or very hot, for which the consumption of the air conditioning means are high, the commands may be different, the consumption reduction potential being different in these two situations. Also, when no load management directive has been issued by the management company 30, the generating means may be configured to continue to generate a command equal to the reference signal.

The management device 10 further comprises means (e.g., the same or different processors as described above) for generating a signal for governing the variation in the electrical power consumed (load management signal) according to the load management directives received from the management company. The management company sends load management directives, in the form of reduction percentage for example, or a target consumption power to attain by the vehicle fleet. The generating means are thus configured to transcribe load management directives of the management company into a signal that can be used by the electrical energy consumption management system.

The management device 10 also comprises modulation means 16 and demodulation means 17 for a signal (e.g., the same or different processors as described above). As explained earlier, these modulation means 16 may perform modulation of the signal for governing the variation in the electrical power consumed using the reference signal. These modulation means 16 may be for example an adder configured to sum the reference signal with the signal for governing the variation in the electrical power consumed. The demodulation means 17 may perform demodulation of the signal of power consumed by the set of vehicles of the fleet. These demodulation means 17 may for example be a multiplier which multiplies the signal of total electrical power consumption of the set of vehicles by the reference signal.

Furthermore, the management device 10 comprises filtering means 18 (e.g., the same or different processors as described above), able to filter the intermediate signal to remove therefrom the high frequency components. This is for example a low pass filter, of which the cut-off frequency is dimensioned to attenuate the high frequency components of the intermediate signal.

Thus, by virtue of the means described above, the management device 10 can implement the method for managing electrical energy consumption. By implementing this method, the air conditioning system of all the vehicles of a fleet are controlled considering the state or situation of use of the vehicles, so as to reduce the overall electrical consumption of the fleet in real-time in response to a load management request coming from the company managing the electricity network.

The invention claimed is:

1. A method comprising:
   sending a consumption reduction command signal to a temperature regulation system of each vehicle in a set of vehicles, the consumption reduction command signal modulated by a reference signal;
   obtaining a second signal of the power consumed by an air conditioning system of the set of vehicles in response to the reference signal; and
   confirming execution of the consumption reduction command signal according to characteristics of the second signal of power consumed by the air conditioning system of the set of vehicles.

2. The method of claim 1, wherein the second signal of the power consumed by the air conditioning system is obtained by determining a third signal of a total electrical power consumed by the set of vehicles in response to the consumption reduction command signal, and demodulating the third signal of total electrical power consumed by the set of vehicles.

3. The method of claim 1, wherein sending the consumption reduction command signal includes adding a value of the consumption reduction command signal to a temperature measured at a same time by a temperature sensor.

4. The method of claim 1, wherein the consumption reduction command signal that is modulated includes a sum of a fourth signal for governing a variation in electrical power consumed and the reference signal.

5. The method of claim 1, wherein the second signal is obtained by obtaining an intermediate signal by multiplying a third signal of total electrical power consumed by the set of vehicles by the reference signal and filtering the intermediate signal.

6. The method of claim 5, wherein receipt of the consumption reduction command signal is confirmed responsive to the intermediate signal that is filtered having an amplitude greater than a predetermined threshold.

7. The method of claim 5, wherein the intermediate signal is filtered using a low-pass filter.

8. The method of claim 2, wherein the third signal is determined by determining fifth signals of electrical powers consumed for sub-sets of the vehicles in response to the consumption reduction command signal and deducing the third signal of the total electrical power consumed by the set of vehicles, by a sum of electrical power signals of the sub-sets of the vehicles.

9. The method of claim 1, wherein the reference signal is a sinusoidal signal.

10. The method of claim 9, wherein the reference signal has a period of 2,504 seconds.

11. The method of claim 9, wherein the reference signal has an amplitude between zero and one degree Celcius.

12. A device configured to manage electrical energy consumption, the device comprising means for confirming an execution of a command for reducing electrical power consumption that are configured to implement the method according to claim 1.

13. The method of claim 9, wherein the reference signal has an amplitude between 0.2 and 0.5 degrees Celsius.

14. The method of claim 9, wherein the reference signal has an amplitude of 0.2 degrees Celsius.

15. A system comprising:
one or more processors configured to send a consumption reduction command signal to a temperature regulation system of each vehicle in a set of vehicles, the consumption reduction command signal modulated by a reference signal, the one or more processors configured to obtain a second signal of the power consumed by an air conditioning system of the set of vehicles in response to the reference signal, the one or more processors configured to confirm execution of the consumption reduction command signal according to characteristics of the second signal of power consumed by the air conditioning system of the set of vehicles.

16. The system of claim 15, wherein the one or more processors are configured to obtain the second signal of the power consumed by the air conditioning system by determining a third signal of a total electrical power consumed by the set of vehicles in response to the consumption reduction command signal and demodulating the third signal of total electrical power consumed by the set of vehicles.

17. The system of claim 15, wherein the one or more processors are configured to add a value of the consumption reduction command signal to a temperature measured at a same time by a temperature sensor.

18. The system of claim 15, wherein the consumption reduction command signal that is modulated includes a sum of a fourth signal for governing a variation in electrical power consumed and the reference signal.

19. The system of claim 15, wherein the one or more processors are configured to obtain the second signal by obtaining an intermediate signal by multiplying a third signal of total electrical power consumed by the set of vehicles by the reference signal and filtering the intermediate signal.

20. The system of claim 19, wherein the one or more processors are configured to confirm receipt of the consumption reduction command signal responsive to the intermediate signal that is filtered having an amplitude greater than a predetermined threshold.

* * * * *